(12) United States Patent
Ling et al.

(10) Patent No.: US 9,503,425 B2
(45) Date of Patent: Nov. 22, 2016

(54) METHOD TO ENABLE DEEP PACKET INSPECTION (DPI) IN OPENFLOW-BASED SOFTWARE DEFINED NETWORK (SDN)

(71) Applicant: Dell Software Inc., Round Rock, TX (US)

(72) Inventors: Hui Ling, Shanghai (CN); Zhong Chen, San Jose, CA (US)

(73) Assignee: DELL SOFTWARE INC., Round Rock, TX (US)

( * ) Notice: Subject to any disclaimer, the term of this patent is extended or adjusted under 35 U.S.C. 154(b) by 0 days.

(21) Appl. No.: 14/964,502

(22) Filed: Dec. 9, 2015

(65) Prior Publication Data

US 2016/0094518 A1 Mar. 31, 2016

Related U.S. Application Data

(63) Continuation of application No. 14/276,984, filed on May 13, 2014, now Pat. No. 9,237,129.

(51) Int. Cl.
| | | |
|---|---|---|
| *G06F 9/00* | (2006.01) | |
| *H04L 29/06* | (2006.01) | |
| *H04L 29/08* | (2006.01) | |

(52) U.S. Cl.
CPC ....... *H04L 63/0254* (2013.01); *H04L 63/1408* (2013.01); *H04L 63/1441* (2013.01); *H04L 67/10* (2013.01)

(58) Field of Classification Search
CPC ........... H04L 63/0254; H04L 63/1408; H04L 63/1441; H04L 67/10; H04L 63/02
USPC ..................................................... 726/11, 13
See application file for complete search history.

(56) References Cited

U.S. PATENT DOCUMENTS

| | | | | |
|---|---|---|---|---|
| 8,307,422 B2* | 11/2012 | Varadhan | ............ | H04L 12/4633 713/151 |
| 8,316,435 B1* | 11/2012 | Varadhan | ................ | H04L 45/50 726/11 |
| 8,369,334 B2* | 2/2013 | Yu | ........................... | H04L 47/10 370/392 |
| 8,713,627 B2* | 4/2014 | Varadhan | ................ | H04L 12/18 370/390 |

(Continued)

FOREIGN PATENT DOCUMENTS

WO    WO 2015/175007    11/2015

OTHER PUBLICATIONS

U.S. Appl. No. 14/606,451, Dynamic Bypass of TLS Connections Matching Exclusion List in DPI-SSL in a NAT Deployment, Jan. 27, 2015.

(Continued)

*Primary Examiner* — Samson Lemma
(74) *Attorney, Agent, or Firm* — Polsinelli LLP

(57) ABSTRACT

The present invention relates to a method and system for performing deep packet inspection of messages transmitted through a network switch in a Software Defined Network (SDN). Embodiments of the invention include a network switch, a controller, and a firewall in a software defined networking environment. In the present invention, the network switch is a simple network switch that is physically separate from the controller and the firewall. The invention may include a plurality of physically distinct network switches communicating with one or more controllers and firewalls. In certain instances, communications between the network switch, the controller, and the firewall are performed using the Open Flow standard communication protocol.

18 Claims, 5 Drawing Sheets

(56) References Cited

U.S. PATENT DOCUMENTS

| | | | |
|---|---|---|---|
| 8,724,633 B2* | 5/2014 | Yu | H04L 47/10 370/392 |
| 9,237,129 B2 | 1/2016 | Ling | |
| 2004/0240669 A1 | 12/2004 | Kempf et al. | |
| 2007/0011734 A1 | 1/2007 | Balakrishnan et al. | |
| 2007/0245401 A1 | 10/2007 | Brabson et al. | |
| 2008/0120236 A1 | 5/2008 | Faith et al. | |
| 2008/0181403 A1 | 7/2008 | Sakamoto | |
| 2008/0263353 A1 | 10/2008 | Droms et al. | |
| 2008/0320582 A1* | 12/2008 | Chen | H04L 63/0245 726/12 |
| 2009/0025077 A1* | 1/2009 | Trojanowski | G06Q 20/027 726/11 |
| 2009/0119407 A1 | 5/2009 | Krishnan | |
| 2009/0204691 A1 | 8/2009 | Xia et al. | |
| 2010/0172257 A1* | 7/2010 | Yu | H04L 47/10 370/252 |
| 2010/0202345 A1 | 8/2010 | Jing et al. | |
| 2010/0299529 A1 | 11/2010 | Fielder | |
| 2011/0055572 A1 | 3/2011 | Vogt et al. | |
| 2011/0161661 A1 | 6/2011 | Medvinsky et al. | |
| 2012/0005480 A1 | 1/2012 | Batke et al. | |
| 2013/0163426 A1* | 6/2013 | Beliveau | H04L 67/327 370/235 |
| 2013/0276092 A1* | 10/2013 | Sun | H04L 63/0227 726/13 |
| 2013/0343295 A1 | 12/2013 | Deo | |
| 2014/0013324 A1 | 1/2014 | Zhang et al. | |
| 2014/0115120 A1 | 4/2014 | Li et al. | |
| 2015/0334090 A1 | 11/2015 | Ling | |
| 2016/0191543 A1 | 6/2016 | Liu | |
| 2016/0219018 A1 | 7/2016 | Raman | |

OTHER PUBLICATIONS

U.S. Appl. No. 14/587,947, Yun Feng Liu, Secure Neighbor Discovery (SEND) Using Pre-Shared Key, Dec. 31, 2014.
PCT Application No. PCT/US2014/045312 International Search Report and Written Opinion mailed Nov. 7, 2014.
U.S. Appl. No. 14/587,947 Final Office Action mailed Apr. 28, 2016.
U.S. Appl. No. 14/587,947 Office Action mailed Jan. 6, 2016.

* cited by examiner

METHOD TO ENABLE DEEP PACKET INSPECTION (DPI) IN OPENFLOW-BASED SOFTWARE DEFINED NETWORK (SDN)

CROSS-REFERENCE TO RELATED APPLICATIONS

The present application is continuation of and claims priority to U.S. patent application Ser. No. 14/276,984 filed May 13, 2014, and entitled "Method to Enable Deep Packet Inspection (DPI) in Openflow-Based Software Defined Network (SDN)," the entire disclosure of which is incorporated herein by reference.

BACKGROUND OF THE INVENTION

Field of the Invention

The present invention is generally related to network security in Software Defined Networking (SDN). More specifically, the present invention relates to deep packet inspection of a flow of data packets in a Software Defined Networking environment.

Description of the Related Art

Deep packet inspection is commonly used today to protect computer networks from viruses and malware. Those familiar with packet communications in computer networks understand that data packets sent through a computer network include numerous layers that may be scanned for threats using deep packet inspection. These layers include the Physical Layer (Layer 1), the Data Link Layer (Layer 2), the Network Layer (Layer 3), the Transport Layer (Layer 4); the Session Layer (Layer 5), the Presentation Layer (Layer 6), and the Application Layer (Layer 7).

Performing deep packet inspection on multiple layers of packets in a stream of packets requires significant computing resources. The concern for protecting computer networks from threats created a market for smart network switches that include deep packet inspection functionality. Smart switches include significant computing resources, where commodity switches do not. Because of this, smart switches are significantly more expensive than commodity switches. Since concerns for security have traditionally outweighed concerns for limiting expenditures in the data center, the use of smart switches has expanded overtime.

Software Defined Networking (SDN) is a new networking architecture with the goal of simplifying computer networks in the data center while reducing the costs associated with the data center. Preferred network switches used in a software defined network are simple inexpensive commodity network switches. The simplicity and the lower costs associated with SDN computer networks as compared to traditional computer networks has led to forecasts that SDN will displace traditional computer networks over time. The SDN architecture, however, has not addressed how to maximize the security of the data center. By replacing smart network switches with inexpensive network switches, SDN increases risks associated with passing viruses and malware through a network switch to computers in the computer network. There is therefore a need for low cost methods for performing deep packet inspection on packets in an SDN environment.

Open Flow is an example of a Software Defined Networking (SDN) protocol. Open Flows uses a collaborative network switch and a controller to direct packets received by the network switch to a destination identified in the packets received. Since Open Flow is currently an important SDN protocol, Open Flow is a protocol that may be used to provide enhanced deep packet inspection functionality in an SDN environment without adding significant costs to an SDN computer network.

Open Flow protocol provides a common communication protocol between SDN controllers and other network devices. The Open Flow protocol describes message exchanges that take place between an Open Flow controller and one or more Open Flow switches. Commands or messages used by the Open Flow protocol may be extended to include new commands or messages that are compatible with the protocol.

A flow of packets is a sequence of packets traversing a network that share a set of header field values. For example, a flow could consist of all packets with the same source and destination IP addresses, or all packets with the same virtual local area network (VLAN) identifier.

SUMMARY OF THE PRESENTLY CLAIMED INVENTION

Figure 1:
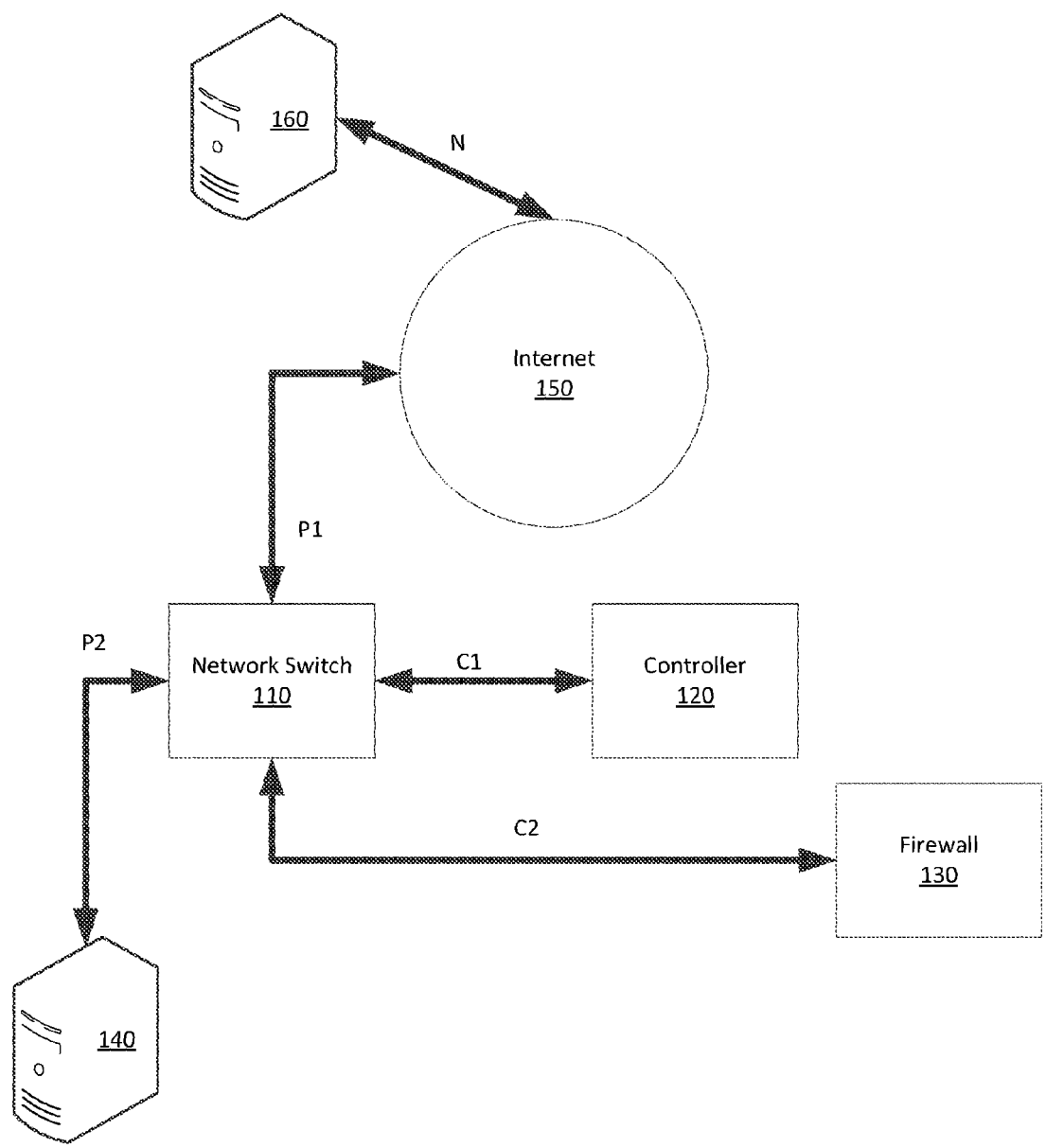
FIG. 1 illustrates a system for deep packet inspection in a software defined network.

The present invention relates to a method and system for performing deep packet inspection of messages transmitted through a network switch in a Software Defined Network (SDN). Embodiments of the invention include a network switch, a controller, and a firewall in a software defined networking environment. In the present invention, the network switch is a simple network switch that is physically separate from the controller and the firewall. The invention may include a plurality of physically distinct network switches communicating with one or more controllers and firewalls. In certain instances, communications between the network switch, the controller, and the firewall are performed using the Open Flow standard communication protocol.

An exemplary method of the invention includes the following series of steps: Receiving a set configuration command from a controller by a network switch. The set configuration command informs the network switch of a deep packet inspection mode selected by the controller. The method continues where the network switch performs the steps of receiving an address of a firewall, establishing communications with the firewall, receiving a get configuration request from the firewall, and sending a configuration reply to the firewall. The configuration reply sent to the firewall includes the operational mode for deep packet inspection that was previously received by the network switch. The network switch then continues with the method by performs the steps of: Receiving a first packet, determining whether information contained in the first packet does not match any entry in a flow table, forwarding at least a portion of the first packet to the controller, and forwarding at least a portion of the packet to the firewall for DPI if the controller decides to do DPI scan on this flow. When the firewall receives the portion of the first packet, the firewall performs deep packet inspection on the portion of the first packet forwarded to it by the network switch.

The method of the invention may be performed by a system, or by a non-transitory data storage medium. The system of the invention will include a network switch, a controller, and a firewall.

DETAILED DESCRIPTION

In an embodiment of the presently claimed invention, the controller will send a set configuration command, and an address of a firewall to the network switch. The set configuration command sets a deep packet inspection mode of the network switch. The address will usually be an internet protocol (IP) address of the firewall. Upon receiving the deep packet set configuration command the network switch will establish communications with the firewall using the address. The network switch will then receive a get configuration request from the firewall, and the network switch will then respond to the get configuration request by sending the firewall a message identifying the deep packet inspection mode setting in the network switch. Modes supported by the system of the invention typically include, yet are not limited to an observe mode and an enforce mode.

In the observe mode, the network switch examines packets (input packets) as they are received by the network switch. When the network switch inputs a packet, the network switch determines whether or not certain information in the packet matches an entry in a flow table. In certain instances, when the information in the packet matches an entry in the flow table, the network switch forwards (mirrors) a copy of at least some of the data associated with a packet flow to the firewall. The number of bytes mirrored to the firewall for a given flow of packets may be configured by the controller. The network switch then outputs (sends) the packet through a port of the network switch toward a destination. In the observe mode, the firewall does not instruct the network switch to drop or forward a packet or a packet flow when a threat is detected. Instead, upon detecting a threat, the firewall may collect information about the threat or may report that threat to another computer (observer) in the computer network.

When the information in the packet does not match an entry in the flow table, the network switch will typically send a copy of at least a portion of the packet to the controller. The network switch will then wait for an instruction from the controller regarding what to do with the packet. In these instances, the controller may instruct the network switch to drop the packet, or instruct the network switch to forward the packet through a port toward a destination, or to send the packet to the firewall for deep packet inspection on the packet. When the controller decides to perform deep packet inspection on a particular packet or a flow of packets, the controller instructs the switch to mirror at least some of the bytes from the particular packet/flow to the firewall, and the firewall performs deep packet inspection on those bytes.

When operating in the enforce mode, the network switch will continue table processing of the packet until it receives a message from the firewall. When the switch receives an allow message from the firewall, the firewall has identified that the packet flow does not contain a threat. After receiving an allow message from the firewall, the network switch will then output the packet toward a destination. In contrast, when the firewall detects a threat in the packet, the firewall will send the network switch a deny message. Upon receiving a deny message, the network switch will drop the packet. In certain instances, the firewall inspects information contained within all layers of a packet. When the network switch is looking for a message from the firewall regarding a particular packet, the network switch may continue processing other packets. In the invention deep packet inspection is performed on a per packet basis, and each packet will either be allowed or denied by the firewall. Since deep packet inspection is performed on a per packet basis, the method described herein does not significantly delay a packet from being processed before being delivered to a destination.

In both the observe and enforce mode, the firewall will always analyze data packets forwarded to it. The difference between the enforce mode and the observe mode is that in enforce mode, the firewall communicates back to the network switch whether a data packet is malicious or benign. In the enforce mode, the network switch enforces the decision made by the firewall. In the observe mode, the firewall does not communicate the results of a deep packet inspection to the network switch, and the network switch does not look for a response from the firewall after forwarding a packet to the firewall.

In certain instances, deep packet inspection will be performed on each packet in a packet flow until deep packet inspection has been performed on a series of packets until a pre-determined number of bytes have been analyzed for threats by the firewall. The controller may determine the number of bits that will be analyzed for a particular flow of packets. A set maximum length command may be used to identify the number of bytes to mirror for a given flow. When using the Open Flow protocol, the maximum length command will be a new command that is compatible with the Open Flow protocol. When a single packet contains more bytes than the number of bytes defined by the maximum length command, deep packet inspection will not be performed on other packets in that packet flow. The set maximum length command allows the controller to control the amount of deep packet inspection that is performed on a given flow. When network traffic is high, the controller may decide to reduce the amount of deep packet inspection to perform on a flow.

FIG. 1 illustrates a system for deep packet inspection in a software defined network. FIG. 1 as illustrated includes a network switch 110, a controller 120, a firewall 130, a destination computer 140, the Internet 150, and a source computer 160.

In certain instances data packets are transmitted over a network connection N from the source computer 160 through the Internet 150 to the network switch 110 through a first port P1. The network switch 110 is depicted including a first communication channel C1, and a second communication channel C2. The network switch 110 communicates with the controller 120 through the first communication channel C1, and communicates with the firewall 130 through the second communication channel C2. Network switch 110 communicates with the destination computer 140 through communication port P2. While independent communication ports C1 and C2 are depicted in FIG. 1, the present invention does not require separate communication channels for communicating between the network switch 110 and the controller 120, or the firewall 130.

Furthermore, different embodiments of the invention may include a plurality of physically distinct network switches communicating with one or more controllers and firewalls.

Or include other embodiments, wherein the functions of the controller and the firewall are built within a single electronic assembly.

Figure 2:
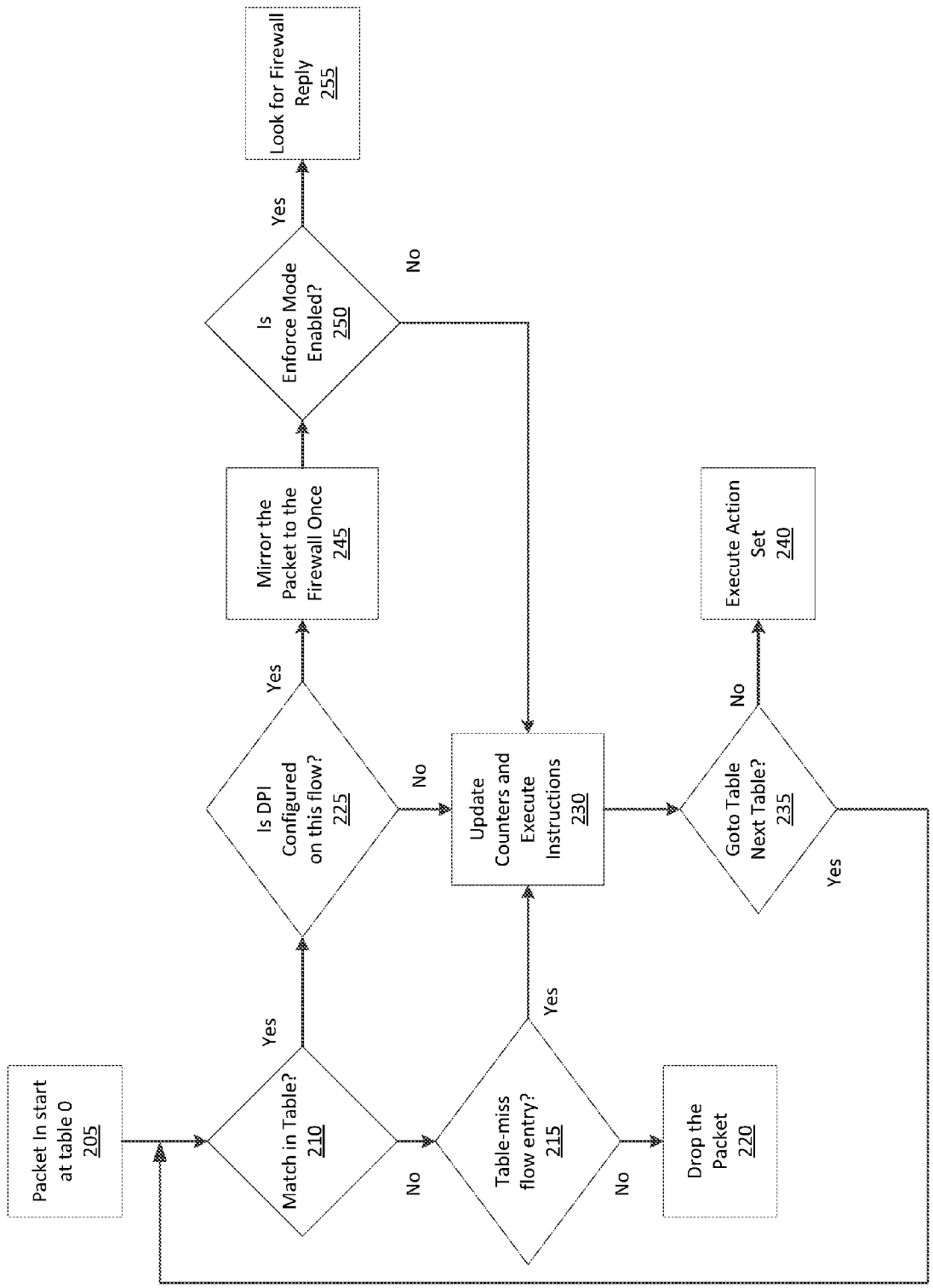
FIG. 2 illustrates a flow diagram for receiving and processing a packet.

FIG. 2 is a simplified flow diagram of the presently claimed invention receiving and processing a packet. In the flow diagram of FIG. 2 a packet is received by the network switch in step 205 "Packet In". Step 210 "Match in Table" is where the network switch determines whether information in the packet received matches an entry in a flow table. When there is a match, program flow moves to step 225 where it is determined whether Deep Packet Inspection is configured on this flow. When Deep Packet Inspection is required, at least a portion of the packet is mirrored to the firewall 245. To prevent unnecessary looping, each packet will typically be mirrored to the firewall once. Step 250 determines whether enforce mode is enabled. When enforce mode is enabled, program flow moves to step 255 "Look for Firewall Reply". At this time the network switch may continue processing other packets. When the firewall is in the enforce mode, the network switch will not output or drop the packet until a message is received from the firewall. When the network switch receives an allow message from the firewall, it will continue processing the packet using another table, until the packet has been processed through all available tables. When the network switch receives a deny message from the firewall, it will drop the packet.

When enforce mode is not enabled, i.e. the switch runs in the observe mode, step 250 proceeds to step 230 where counters are updated and where instructions associated Software Defined Networking (SDN) actions are prepared. When deep packet inspection is determined not needed in step 225, program flow also moves to step 230. After step 230, program flow moves to step 235 "Goto Next Table?". Program flow moves from step 235 back to step 210 when the network switch determines that there are other flow tables to compare with information contained within the packet. When there are no remaining flow tables to compare with the packet information, program flow moves from step 235 to step 240 where certain actions of SDN are performed in the network switch. These actions may include outputting the packet to a destination.

When step 210 determines that information in the packet received does not match an entry in the flow table (a table-miss) program flow proceeds to step 215. Step 215 "Table—miss flow entry" determines whether a "table miss" flow entry exists in the table. The first packet received for a given flow of packets will usually be matched to the special "table miss" flow entry. When the packet is matched to the "table miss" entry as step 215, program flow moves to step 230 where counters are updated and instructions are executed. When no "table miss" entry exists in step 215, program flow moves to step 220 where the packet is dropped.

Figure 3:
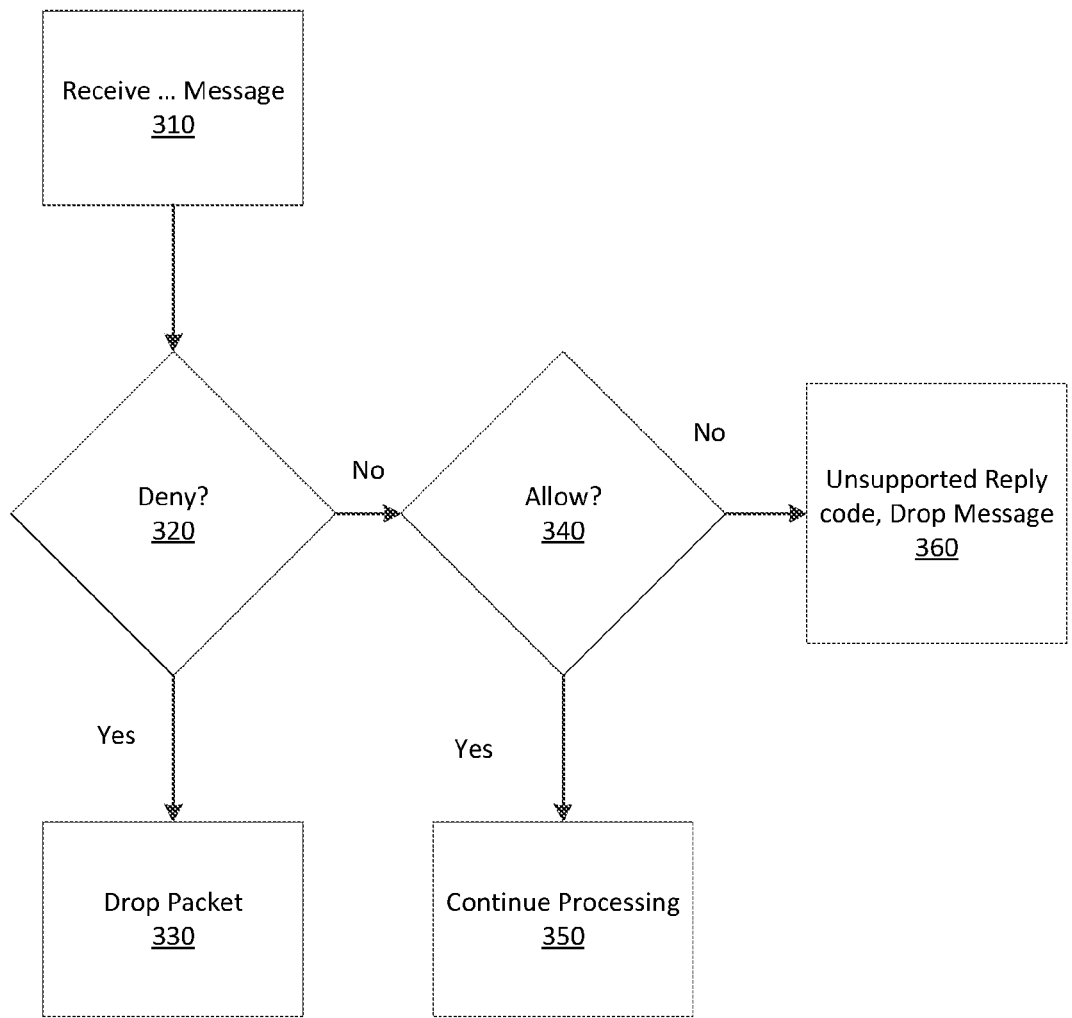
FIG. 3 illustrates a flow diagram for responding to messages from a firewall.

FIG. 3 is a flow diagram of the network switch responding to messages from the firewall. Step 310 is where the network switch receives a message from the firewall. Step 320 determines whether the message received is a deny message, if so program flow moves to step 330 where the packet is dropped. Step 340 determines whether the message is an allow message, if so program flow moves to step 350 where the network switch continues processing the packet using other tables. In the instance where the message from the firewall is not a deny or an allow message, program flow moves to step 360 where the network switch drops the packet because the code in the reply message is unsupported.

Figure 4:
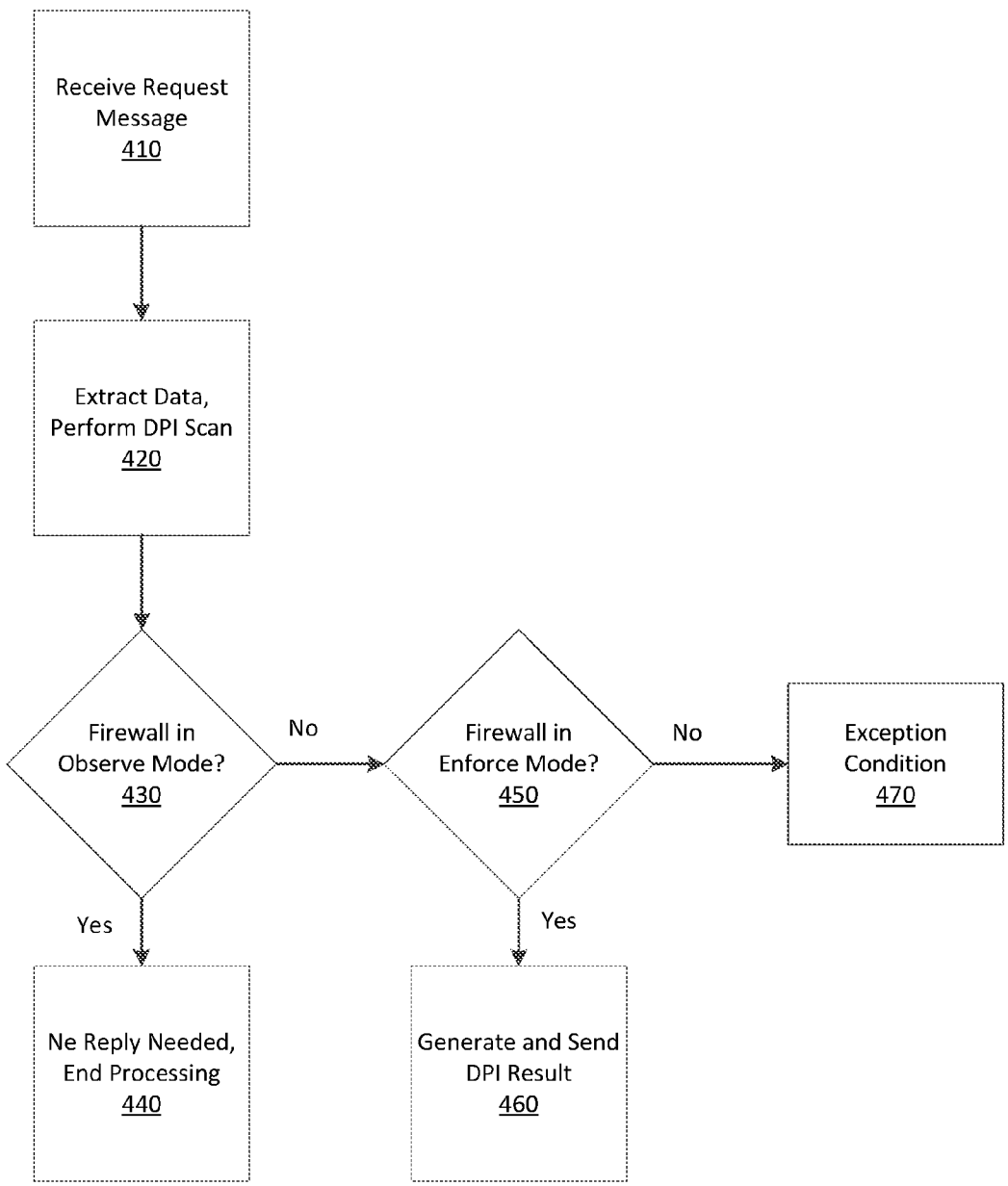
FIG. 4 illustrates a flow diagram for receiving a packet, performing deep packet inspection, and sending a message to a network switch regarding the packet.

FIG. 4 is a flow diagram of the firewall receiving a packet, performing deep packet inspection on the packet, and sending a message to the network switch regarding the packet. In step 410, the firewall receives a request message from the network switch. This request message includes at least a portion of the packet. Once the request message is received from the network switch, the firewall extracts the packet data from the message and performs deep packet inspection (DPI) on the packet data 420. In step 430 the firewall determines whether the firewall is in observe mode, if yes the firewall stops processing the packet at step 440. The firewall will not send a message to the network switch after receiving a request message from the network switch when the firewall is in the observe mode. When the firewall is not in observe mode, program flow moves from step 430 to step 450. Here the firewall determines whether it is in the enforce mode 450. When the firewall is in the enforce mode, program flow then moves to step 460 where the firewall sends the DPI result of the packet back to the network switch through a reply message. When the firewall is not in observe mode or in enforce mode, the firewall will identify an exception condition 470. An exception message may cause the firewall to send an unsupported reply code in a message to the network switch.

Alternate implementations of the present invention include the instance where the network switch does not communicate directly with the firewall. In such embodiments, the communications between the network switch and the firewall may be passed through the controller.

In certain instances the invention utilizes new command types not described in a Software Defined Networking specification. Such new command types include communications between the network switch and the firewall, they include, yet are not limited to a reply message from the network switch to the firewall indicating a deep packet inspection mode, and a command for mirroring packet data to the firewall. Packet data forwarded to the firewall is a form of mirroring, wherein all or part of a data packet is sent to the firewall.

In a preferred embodiment of the invention, commands or messages used will be compatible with the Open Flow protocol specification. Some of these commands or messages may already be defined in the Open Flow protocol specification. Other these commands or protocols used with the present invention are new commands that are allowed by the Open Flow protocol specification.

New commands or messages used when sending packet data to the firewall may also include a length field, may identify a port though which the packet data should be sent to the firewall, and may include a maximum length field. These fields enable an administrator to balance performance versus a level of security. Packet data contained within a communication from the network switch may be padded, or be aligned (at a bit, byte, or word level).

New commands or messages may also include other fields or parameters, including yet not limited to: a buffer ID, a total length field, a deep packet inspection mode field, a pad align field, an allow code, a deny code, and a frame type field. Messages between the controller, the firewall, and the network switch may also identify the IP address of the controller or the firewall.

Figure 5:
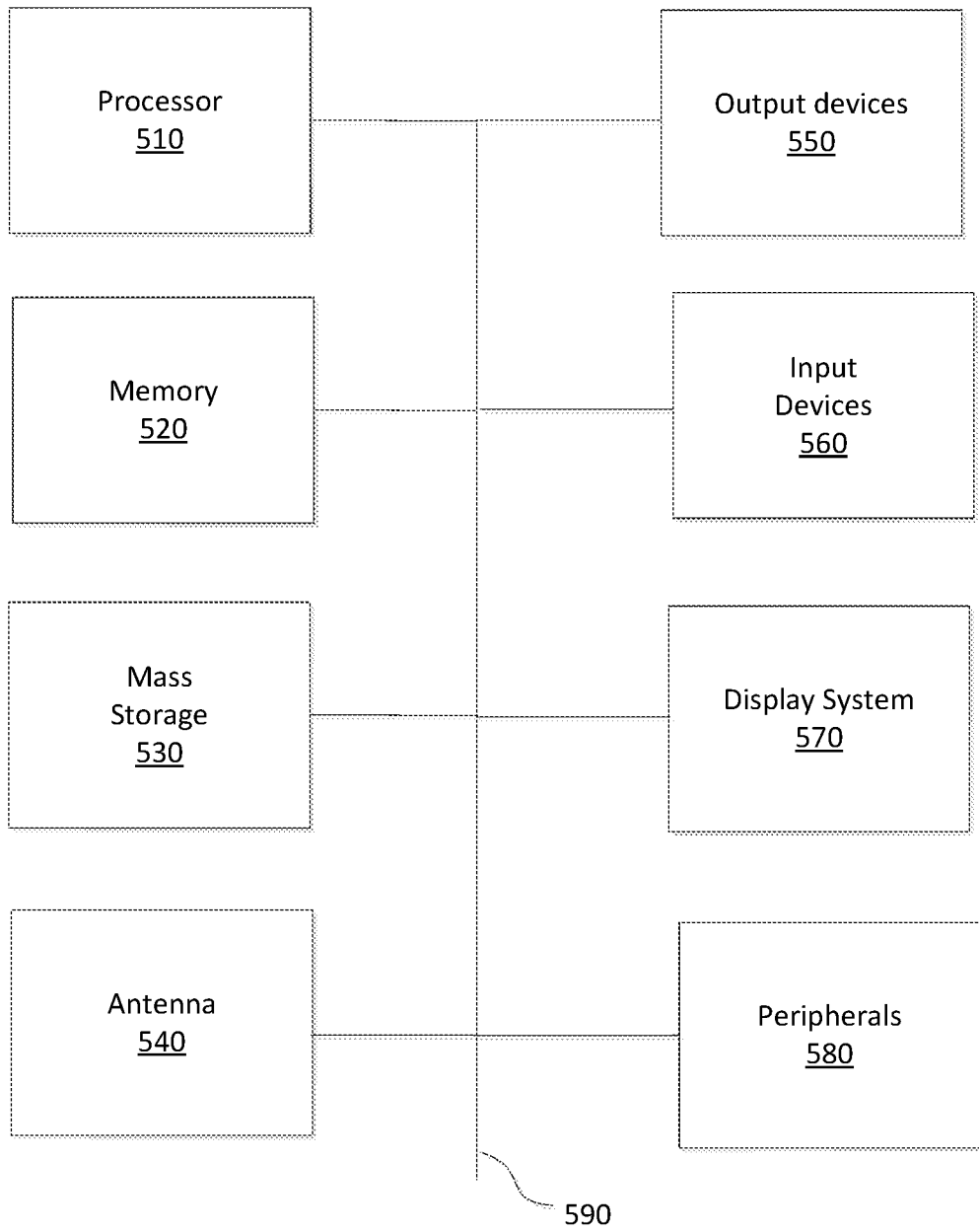
FIG. 5 illustrates a block diagram of a computing device that may be used to implement various embodiments of the present invention.

FIG. 5 is a block diagram of a device for implementing the present technology. FIG. 5 illustrates an exemplary computing system 500 that may be used to implement a computing device for use with the present technology. System 500 of FIG. 5 may be implemented in the contexts of the likes of clients and servers. The computing system 500 of FIG. 5 includes one or more processors 510 and memory 520. Main memory 520 may store, in part, instructions and data for execution by processor 510. Main memory can store the executable code when in operation. The system 500 of FIG. 5 further includes a storage 520, which may include mass storage and portable storage, antenna 540, output devices 550, user input devices 560, a display system 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the storage 530, peripheral device(s) 580 and display system 570 may be connected via one or more input/output (I/O) buses.

Storage device 530, which may include mass storage implemented with a magnetic disk drive or an optical disk drive, may be a non-volatile storage device for storing data and instructions for use by processor unit 510. Storage device 530 can store the system software for implementing embodiments of the present invention for purposes of loading that software into main memory 510.

Portable storage device of storage 530 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device.

Antenna 540 may include one or more antennas for communicating wirelessly with another device. Antenna 516 may be used, for example, to communicate wirelessly via Wi-Fi, Bluetooth, with a cellular network, or with other wireless protocols and systems. The one or more antennas may be controlled by a processor 510, which may include a controller, to transmit and receive wireless signals. For example, processor 510 execute programs stored in memory 512 to control antenna 540 transmit a wireless signal to a cellular network and receive a wireless signal from a cellular network.

The system 500 as shown in FIG. 5 includes output devices 550 and input device 560. Examples of suitable output devices include speakers, printers, network interfaces, and monitors. Input devices 560 may include a touch screen, microphone, accelerometers, a camera, and other device. Input devices 560 may include an alpha-numeric keypad, such as a keyboard, for inputting alpha-numeric and other information, or a pointing device, such as a mouse, a trackball, stylus, or cursor direction keys.

Display system 570 may include a liquid crystal display (LCD), LED display, or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The presently claimed invention may be implemented in various forms of hardware and software. The present invention may be controlled in part or entirely in a non-transitory computer storage medium having embodied thereon a program executable by a processor. The present invention may also be implemented using an Application Specific Integrated Circuit (ASIC), or other forms of electronic hardware.

While various embodiments have been described above, it should be understood that they have been presented by way of example only, and not limitation. The description are not intended to limit the scope of the presently claimed invention. The present descriptions are intended to cover alternatives, modifications, and equivalents consistent with the spirit and scope of the disclosure.

What is claimed:

1. A method for performing deep packet inspection on a plurality of data packets belonging to a flow of data packet, the method comprising:
    receiving a first packet at a switch; identifying that the first packet belongs to a flow of a plurality of packets; mirroring at least a portion of the first packet to a firewall over a first communication interface at the switch, wherein the portion of the first packet is scanned by a deep packet inspection (DPI) scanner at the firewall;
    receiving a message from the firewall indicating that the portion of the first packet does not include a threat;
    sending the first packet to a destination identified by information contained in the first packet over a port at the switch in response to receiving the message from the firewall indicating that the first packet does not include a threat;
    receiving a second packet at the switch;
    identifying that the second packet belongs to the flow of the plurality of packets;
    mirroring, by a hardware processor, at least a portion of the second packet to the firewall over the first communication interface at the switch, wherein the firewall scans the portion of the second packet by a DPI scanner and identifies that the second packet includes a threat;
    prior to receiving the first packet: setting the switch to an observe mode; receiving a plurality of other packets that are associated with the flow;
    mirroring, by the hardware processor, at least a portion of each of the plurality of other packets to the firewall;
    sending each of the other packets to a destination without waiting for a message from the firewall when the switch is set to the observe mode, wherein the firewall collects information from at least one of the other packets received from the switch; and setting the switch to an enforce mode.

2. The method of claim 1, wherein the firewall sends a report to another computer identifying that the second packet includes a threat.

3. The method of claim 1, further comprising receiving a set configuration command from a controller, wherein the set configuration command identifies that the flow of the plurality of packets is associated with a DPI level.

4. The method of claim 3, wherein the set configuration command received from the controller includes a count, the count corresponds to the size of the portion of the first and the second data packet sent to the firewall for DPI.

5. The method of claim 1, further comprising:
receiving a command from a controller identifying a count that corresponds to the size of the portion of the first data packet sent to the firewall before the switch receives the first packet; and
receiving a second command from the controller identifying a count that corresponds to the size of the portion of the second data packet sent to the firewall before the switch receives the second packet.

6. The method of claim 1, further comprising:
receiving a message from the firewall by the switch indicating that the second packet includes the threat; and
dropping the second packet by the switch.

7. The method of claim 1, further comprising:
receiving a message from the firewall by the switch indicating that the second packet includes the threat; and
the switch dropping the flow of packets.

8. The method of claim 1, further comprising:
receiving a third packet at the switch;
identifying that the third packet is not associated with an entry in a flow table at the switch;
sending at least a portion of the third packet to the firewall; and
receiving a message from the firewall regarding the third packet.

9. The method of claim 8, further comprising the switch dropping the third packet when the message received from the firewall indicates that the third packet should be dropped.

10. The method of claim 8, further comprising the switch sending the third packet to the destination or another destination when the received message indicates that the third packet can be sent to the destination or the another destination.

11. A non-transitory computer-readable storage medium embodied thereon a program executable by a hardware processor for performing a method, the method comprising:
receiving a first packet at a switch;
identifying that the first packet belongs to a flow of a plurality of packets;
mirroring at least a portion of the first packet to a firewall over a first communication interface at the switch, wherein the portion of the first packet is scanned by a deep packet inspection (DPI) scanner at the firewall;
receiving a message from the firewall indicating that the portion of the first packet does not include a threat;
sending the first packet to a destination identified by information contained in the first packet over a port at the switch in response to receiving the message from the firewall indicating that the first packet does not include a threat;
receiving a second packet at the switch;
identifying that the second packet belongs to the flow of the plurality of packets;
mirroring at least a portion of the second packet to the firewall over the first communication interface at the switch, wherein the firewall scans the portion of the second packet by a DPI scanner and identifies that the second packet includes a threat;
setting the switch to an observe mode;
receiving a plurality of other packets that are associated with the flow;
mirroring by the hardware processor, at least a portion of each of the plurality of other packets to the firewall;
sending each of the other packets to a destination without waiting for a message from the firewall when the switch is set to the observe mode, wherein the firewall collects information from at least one of the other packets received from the switch; and
setting the switch to an enforce mode.

12. The non-transitory computer-readable storage medium of claim 11, wherein the firewall sends a report to another computer identifying that the second packet includes a threat.

13. The non-transitory computer-readable storage medium of claim 11, the program further executable to receive a set configuration command from a controller, wherein the set configuration command identifies that the flow of the plurality of packets is associated with a DPI level.

14. The non-transitory computer-readable storage medium of claim 13, wherein the set configuration command received from the controller includes a count, the count corresponds to the size of the portion of the first and the second data packet sent to the firewall for DPI.

15. The non-transitory computer-readable storage medium of claim 11, further comprising:
receiving a command from a controller identifying a count that corresponds to the size of the portion of the first data packet sent to the firewall before the switch receives the first packet; and
receiving a second command from the controller identifying a count that corresponds to the size of the portion of the second data packet sent to the firewall before the switch receives the second packet.

16. The non-transitory computer-readable storage medium of claim 11, the program further executable to:
receive a message from the firewall by the switch indicating that the second packet includes the threat; and
drop the second packet.

17. The non-transitory computer-readable storage medium of claim 11, further comprising:
receiving a message from the firewall by the switch indicating that the second packet includes the threat; and
the switch dropping the flow of packets.

18. A system for performing deep packet inspection on a plurality of data packets belonging to a flow of data packets, the system comprising:
a hardware processor;
a controller; a firewall; and
a switch, wherein the switch:
receives a set configuration command from the controller;
receives a first packet;
identifies that the first packet belongs to a flow of a plurality of packets;
mirrors at least a portion of the first packet to the firewall over a first communication interface at the switch according to the set configuration command, wherein the portion of the first packet is scanned by a deep packet inspection (DPI) scanner at the firewall;

receives a message from the firewall indicating that the portion of the first packet does not include a threat;

sends the first packet to a destination identified by information contained in the first packet over a port at the switch in response to receiving the message from the firewall indicating that the first packet does not include a threat;

receives second packet at the switch; identifies that the second packet belongs to the flow of the plurality of packets;

mirrors at least a portion of the second packet to the firewall over the first communication interface at the switch, wherein the firewall scans the portion of the second packet by a DPI scanner and identifies that the second packet includes a threat;

set the switch to an observe mode; receive a plurality of other packets that are associated with the flow;

mirror at least a portion of each of the plurality of other packets to the firewall;

send each of the other packets to a destination without waiting for a message from the firewall when the switch is set to the observe mode, wherein the firewall collects information from at least one of the other packets received from the switch; and set the switch to an enforce mode.

* * * * *